UNITED STATES PATENT OFFICE.

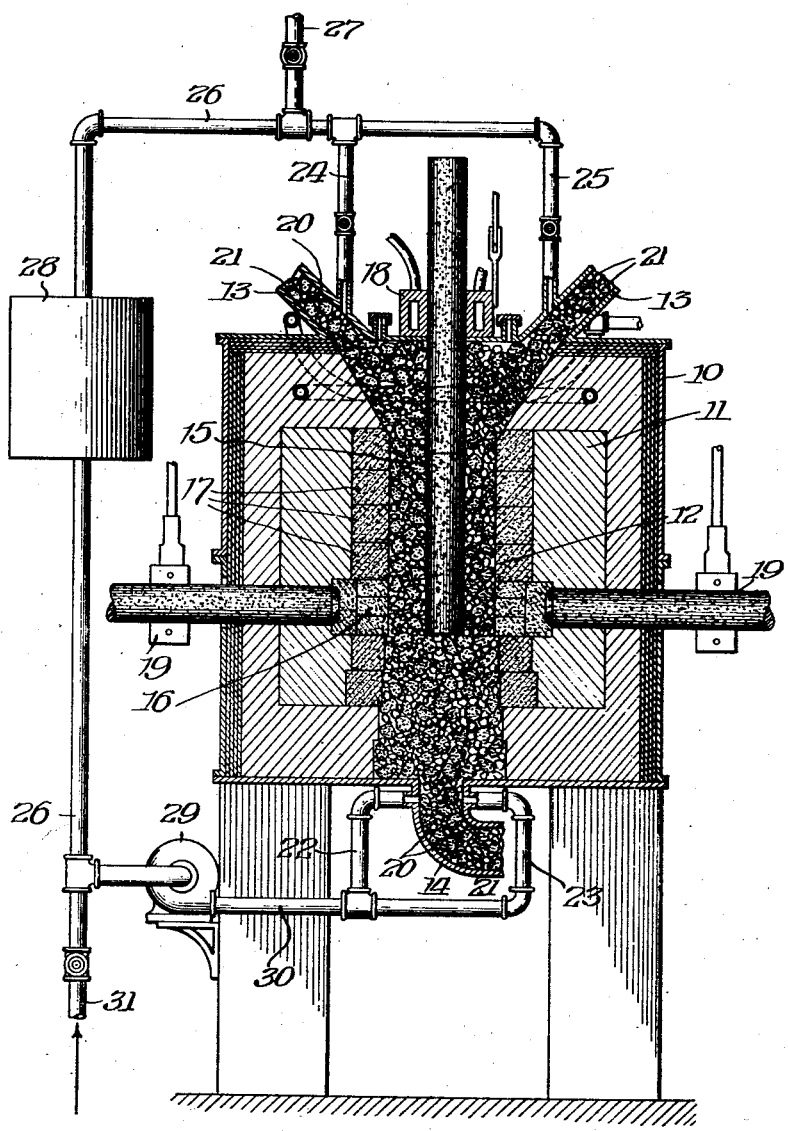

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF ALUMINUM NITRID AND THE LIKE.

1,344,153. Specification of Letters Patent. Patented June 22, 1920.

Application filed July 10, 1919. Serial No. 309,800.

*To all whom it may concern:*

Be it known that I, MARK SHOELD, a subject of the King of Sweden, residing at Chicago, in the county of Cook and State of Illinois, have invented certain new and useful Improvements in the Production of Aluminum Nitrid and the like, of which the following is a specification.

Many patents have been granted in the principal countries of the world for various processes and appliances for the fixation of nitrogen by the production of aluminum nitrid from pure or impure alumina, carbon, and a nitrogen-containing gas in electrical furnaces at suitable temperatures for the reaction, but so far as I am advised, none of these processes or appliances, with the exception of the process of this application, have been found commercially feasible, even though large sums of money have been expended in attempts to practise them on a large and economical scale.

In order to increase the porosity of the finely-divided alumina and carbon mixture to facilitate the flow of the gas therethrough, it has heretofore been proposed to use an excess of carbon, but this seemingly did not solve the difficulty.

It has also been suggested, in order to secure a uniform distribution of the electric current through the mass and hence an even heating in those cases where the current passes directly through the mixture, to briquet the mixture and control the current flow, or the resistance of the material treated, by the amount of carbon employed in the briquets. This plan, however, did not meet with the success contemplated.

Additionally, it has been recommended that, in those continuous electrical furnaces in which the material undergoing treatment serves as the heating resistance, an excess of carbon be employed in sufficient quantities to insure the passage of the current in spite of the reactionary losses of carbon necessary to the transformation of the alumina into aluminum nitrid. In such case it has been indicated that the mixture may be in a pulverulent state or in the form of agglomerates, or the alumina and the carbon necessary to the reaction may be in the form of agglomerates, the carbon intended to insure the desired conductivity being added separately. This process has failed of commercial and economical results.

The problem to be solved was the continued uniform heating of the mixture at the needed temperature, which, of course, required an even, unchanging electrical resistance throughout the mass, where the material treated acts as the resistance medium, in other words, in those cases where the electrical current flows directly through the material. If there is any fusion of the material or local breaking down of the resistance even in a comparatively small degree, the uniform heating of the whole furnace is disturbed and deranged and the electrical current more or less short-circuited through such local area.

If the mixture of alumina and carbon is employed in the form of briquets they have a tendency to fuse under the high heat and to become welded or fused together, with the obvious and expected result that the electrical resistance at such points becomes greatly reduced and the current greatly increased at those spots, making conditions worse and drawing away, diverting, shunting, or short-circuiting the current from the other portions of the mass where it is required. Thus the heat becomes unevenly distributed throughout the mass with the natural objectionable and detrimental results specified. For an effective and economical outcome the heating of the mass must be maintained substantially unvarying and even throughout.

The main object of the present invention is to overcome such troubles and in accordance therewith the finely-divided alumina, which may be pure or more or less impure, as calcined natural bauxite, is briqueted with only enough comminuted carbon for the chemical reaction by employing any usual and suitable binder. Such briquets may conveniently be in the form and style of cylinders about two inches in diameter and one and three-quarters inches long, and I have found that the more such briquets are compressed within reasonable limits, the better the results produced, probably because of the more intimate physical association of the alumina and carbon. Mechanically mixed with these briquets I use just enough carbon or other electrically-conductive, practically non-fusible, resisters of irregular shape, but averaging about five to six inches in diameter, to prevent the briquets from fusing. The sizes and shapes of the briquets and resisters are, of course, subject to radical changes. These carbon resisters being of greater electrical conductivity than the compressed briquets carry practically all of the electric current and constitute heating elements by which the temperature of the briquets by conduction is brought to the proper point for the reaction. Such resisters may be aptly termed "chemically-neutral" in that they do not enter into the chemical transformation. They also mechanically separate the briquets, hence overcoming any tendency which the latter might exhibit to become fused or welded together, and they are desirably employed in such quantity that by contacting with one another they provide a number of parallel conductive paths through the mixture for the electric current. It is not quite certain to what extent the heating resistance of these carbon elements distributed throughout the mass of briquets is due to their small degree of electrical conductivity and what is attributable to their relatively poor contact with one another, and it is seemingly unnecessary to know the exact facts in this regard, as the desired results follow when the features and principles of this invention are employed in the manner stated. Approximately 60 to 65 per cent. of the mechanical mixture by weight may conveniently comprise such resisters, and about 35 to 40 per cent. briquets. For conservation of heat, it is desirable to maintain the quantity of resisters used as low as possible without fusion of the briquets, but this is not to be understood as implying that the latter do not very slightly sinter. Such an occurrence seemingly facilitates the desired reaction. These resistance bodies are desirably formed of carbon or graphite, but they may be of any suitable comparatively infusible material or compositions of more than one. Such carbon may be in the form of coke, coal, or specially prepared carbon similar to electrode carbon, the latter being preferable. By reason of their larger size, thus providing between them interstices readily filled or occupied by the smaller briquets, such resisters seemingly, to some degree at least, shield the briquets from mechanical injury, hence preventing them from becoming shattered or broken.

Such mixture of briquets and resistance bodies is continuously passed as a column downwardly through an electric furnace traveling past and in contact with stationary electrodes which employ the mixture between them as a resistance medium, and at the same time, a current of nitrogen or a gas containing nitrogen flows upwardly through the mixture, supplying the needed nitrogen for the chemical reaction, which occurs at a temperature of about 1800 to 2000 degrees centigrade. Producer or generator gas may be economically employed for this purpose.

It will be appreciated that in this new process the carbon of the resisters, or what might be called the excess carbon so far as the chemical reaction is concerned, does not increase the porosity of the briquets, it being desirable in them to employ only the carbon needed for the chemical transformation, and to make the briquets rather condensed than unduly porous. Furthermore, since the resisters carry practically, if not all of the electrical current, they do not compensate for the consumption of the carbon in the briquets, the resistance of the furnace being much the same whether the chemical change has or has not taken place in the briquets. Nor is the amount of current flow determined by the number or quantity of the resisters employed. As stated above, enough only are used to prevent fusing or welding together of the briquets and then the proper current flow is secured by using an electrical current of suitable voltage. The degree of heat developed is determined by the electrical voltage employed, the resistance of the furnace remaining more or less constant.

Owing to the difference in size of the elements of which it is composed, the discharged mixture can be readily separated into bodies of chemically modified briquets and resisters, as by screening. The carbon resisters can be used over and over since they are subject to no chemical change and only to slight mechanical wear. When after long repeated use their size is so reduced that they are only slightly larger than the briquets, they are discarded, because further use would render their segregation from the briquets more difficult.

To enable those skilled in this industry to understand and appreciate the operation of an electric furnace in carrying out the principles of this invention and to comprehend the benefits accruing therefrom, in the accompanying drawing I have illustrated in central vertical section a structure of electric furnace adapted for the performance of this new process or method.

By reference to this drawing, it will be seen that the electric furnace 10 is suitably lined with any desirable and efficient refractory material 11 and is formed with a central vertical passage 12 to which the mechanical mixture of briquets and resisters have entrance through the opposed hopper spouts 13, 13, the treated material passing out of the lower end of the furnace at 14. By means not shown, the feeding of this material to the furnace and its discharge therefrom is made continuous; such feeding and discharging means being of any usual and convenient type. This furnace has a central depending graphite electrode 15 and a ring electrode 16 concentrically spaced therefrom, the heat chamber proper being lined with infusible carbon blocks or bricks 17. In the usual way, by means of electric terminals 18 and 19, 19, these associated graphite electrodes are connected with an electric circuit so that the current passes through the intervening material between them and produces sufficient heat to carry out the chemical transformation.

The briquets 20 of the mechanical mixture are desirably composed of comminuted or finely divided carbon, alumina, and a suitable binder, and the resister elements 21 are of carbon or other suitable comparatively non-fusible substance. Such resistance elements, which are of greater electrical conductivity than the briquets, by contacting with one another, provide a number of paths in parallel for the passage of the electric current, each of such courses being composed of a collection of associated contacting resisters, which, due to their internal resistance, and to the opposition to the current flow they provide by reason of their comparatively poor contact with one another, cause the development or generation of sufficient heat to effect its conduction to the adjacent briquets, where it brings about the desired chemical results. Thus these resistance elements, divert, shift, or shunt the electric current away from the more or less fusible briquets, although a very small portion of the current possibly passes through the latter, insufficient, however, in amount to cause danger of fusing. These infusible, resistance bodies are, therefore, comparatively uniformly distributed throughout the mixture and cause a satisfactory practically even heating of the briquets without the attendant disadvantages of compelling the latter to heat themselves by reason of their own electrical resistance. Nitrogen gas, or gas containing nitrogen, is caused to flow up through the furnace and its contained charge of the mixture entering through the branch pipes 22, 23, of the lower portion of the apparatus. This cool gas, in passing upwardly through the hot mixture which has descended through the heat zone, reduces the temperature of such material so that it may be discharged from the furnace in relatively cool condition, and is in this manner itself advantageously heated preliminary to its upward passage through the heat zone between the electrodes. The hot, more or less spent or exhausted gas, after having traversed the heat chamber, during the continuance of its progressive upward travel, flows through the cool, incoming, descending mixture, transmitting a large portion of its heat thereto, thus desirably initially raising the temperature of the mixture before it reaches the heat zone, and also advantageously cooling the gas, which then passes out through the branch pipes 24 and 25 in the spouts of the hoppers which unite in the common pipe 26. From the latter a portion only of the somewhat spent gas is exhausted or discharged through a delivery pipe 27, the remainder of the gas passing through a scrubber 28 where it is initially purified and cooled, then traversing a blower 29 and being conducted through a pipe 30 to the admission pipes 22 and 23, pipe 26 between the scrubber and blower having connected therewith an intake-pipe 31 through which fresh cool gas is admitted to replenish the supply and compensate for that consumed, chemically modified, or discharged in carrying out the process. Thus, the gas continuously traverses the circuit, having a part subtracted therefrom and a part added thereto in the manner indicated. It is to be understood that the amount of the gas fed to the material is in excess of that actually needed for the carrying out of the chemical reaction, the surplus being employed for its cooling function on the material which has passed through the heat chamber and its heating effect on the incoming material. The gas is used over and over, being strengthened and replenished in part during each cycle to compensate for losses.

As explained above, the larger carbon resisters are separated mechanically from the chemically-modified briquets after the mixture is discharged from the furnace and the resisters are used repeatedly until by wear their size is sufficiently reduced to warrant their discarding.

Whereas it has been indicated that it is desirable to use alumina either pure or impure as the source of aluminum it is to be understood that the invention is not limited and restricted except as indicated in the appended claims to the particular materials or chemicals specified, the invention in its broader aspect relating to the manner of securing the practically even heating of the briquets in the manner illustrated and described by the employment of the chemically-neutral resisters which act as heating elements when subjected to the electric current.

It will be understood that the apparatus shown and described is merely presented by way of convenient example of an appliance adapted for the performance of this process or method and that the invention is not limited to any particular type or style of appliance in which it is used, the invention having the broad underlying principles clearly set forth in the appended claims.

I claim:

1. The method of producing aluminum nitrid by electrically-generated heat comprising forming a mechanical mixture composed of approximately 35 to 40 per cent. by weight of briquets to be chemically modified containing finely-divided aluminous and carbonaceous materials in the approximate proportion of 3 to 1 by weight, the briquets being of cylindrical form about 2 inches in diameter and substantially 1¾ inches in length, and approximately 60 to 65 per cent. by weight of larger substantially-infusible resister-elements of irregular shape averaging about 5 to 6 inches in diameter which do not enter into the chemical reaction and which are of greater electrical conductivity than and which prevent fusion of the briquets, continuously feeding the mixture between relatively-stationary electrodes, causing a nitrogen-containing gas to flow continuously through the mixture between the electrodes in a direction the opposite of that of the travel of the mixture, passing an electric current through such electrodes and mixture thereby sufficiently heating the briquets by the heat developed by the resister-elements to chemically change the briquets producing aluminum nitrid, and segregating the resister-elements from the chemically-transformed briquets and using them for a continuance of the process, substantially as described.

2. The method of producing aluminum nitrid by electrically-generated heat comprising forming a mechanical mixture composed of approximately 35 to 40 per cent. by weight of briquets to be chemically modified containing finely-divided aluminous and carbonaceous materials in the approximate proportion of 3 to 1 by weight, and approximately 60 to 65 per cent. by weight of larger substantially - infusible resister - elements which do not enter into the chemical reaction and which are of greater electrical conductivity than and which prevent fusion of the briquets, continuously feeding the mixture between relatively - stationary electrodes, causing a nitrogen-containing gas to flow continuously through the mixture between the electrodes in a direction the opposite of that of the travel of the mixture, passing an electric current through such electrodes and mixture thereby sufficiently heating the briquets by the heat developed by the resister - elements to chemically change the briquets producing aluminum nitrid, and segregating the resister elements from the chemically transformed briquets and using them for a continuance of the process, substantially as described.

3. The method of producing aluminum nitrid by electrically-generated heat comprising forming a mechanical mixture composed of approximately 35 to 40 per cent. by weight of briquets to be chemically modified containing finely-divided aluminous and carbonaceous materials in the approximate proportion of 3 to 1 by weight, and substantially 60 to 65 per cent. by weight of larger substantially - infusible resister - elements which do not enter into the chemical reaction and which are of greater electrical conductivity than and which prevent fusion of the briquets, continuously feeding the mixture between relatively-stationary electrodes, causing a nitrogen-containing gas to flow continuously through the mixture between the electrodes in a direction the opposite of that of the travel of the mixture, passing an electric current through such electrodes and mixture thereby sufficiently heating the briquets by the heat developed by the resister-elements to chemically change the briquets producing aluminum nitrid, substantially as described.

4. The method of producing aluminum nitrid by electrically-generated heat comprising forming a mechanical mixture composed of approximately 35 to 40 per cent. by weight of briquets to be chemically modified containing finely-divided aluminous and carbonaceous materials in the approximate proportion of 3 to 1 by weight, and substantially 60 to 65 per cent. by weight of larger substantially-infusible resister-elements which do not enter into the chemical reaction and which are of greater electrical conductivity than and which prevent fusion of the briquets, and simultaneously subjecting the mixture to a nitrogen-containing gas and passing therethrough an electric current thereby sufficiently heating the briquets by the heat developed by the resister-elements to chemically change the briquets producing aluminum nitrid, substantially as described.

5. The method of producing aluminum nitrid by electrically-generated heat comprising forming a mechanical mixture composed of approximately 35 to 40 per cent. by weight of briquets to be chemically modified containing finely-divided aluminous and carbonaceous materials in the approximate proportion of 3 to 1 by weight, and substantially 60 to 65 per cent. by weight of practically-infusible resister-elements of substantial size which do not enter into the chemical reaction and which are of greater electrical conductivity than and which prevent fusion of the briquets, and simultaneously subjecting such mixture to a nitrogen-containing gas and to the passage therethrough of an electric current thereby sufficiently heating the briquets by the heat developed by the resister-elements to chemically change the briquets producing aluminum nitrid, substantially as described.

6. The method of producing aluminum nitrid by electrically-generated heat comprising forming a mechanical mixture composed of approximately 35 to 40 per cent. by weight of briquets to be chemically modified containing finely-divided aluminous and carbonaceous materials and approximately 60 to 65 per cent. by weight of practically-infusible resister-elements of substantial size which do not enter into the chemical reaction and which are of greater electrical conductivity than and which prevent fusion of the briquets, and simultaneously subjecting such mixture to a nitrogen-containing gas and the passage of an electric current therethrough, thereby sufficiently heating the briquets by the heat developed by the resister-elements to chemically change the briquets producing aluminum nitrid, substantially as described.

7. The method of producing aluminum nitrid by electrically-generated heat comprising forming a mechanical mixture composed of briquets to be chemically modified containing finely-divided aluminous and carbonaceous materials in the approximate proportion of 3 to 1 by weight, and larger substantially-infusible resister-elements which do not enter into the chemical reaction and which are of greater electrical conductivity than and which prevent fusion of the briquets, continuously feeding the mixture between relatively-stationary electrodes, causing a nitrogen-containing gas to flow continuously through the mixture between the electrodes in a direction the opposite of that of the travel of the mixture, and passing an electric current through such electrodes and mixture thereby sufficiently heating the briquets by the heat developed by the resister-elements to chemically change the briquets producing aluminum nitrid, substantially as described.

8. The method of producing aluminum nitrid by electrically-generated heat comprising forming a mechanical mixture composed of briquets to be chemically modified containing finely-divided aluminous and carbonaceous materials in the approximate proportion of 3 to 1 by weight, and larger substantially-infusible resister-elements which do not enter into the chemical reaction and which are of greater electrical conductivity than and which prevent fusion of the briquets, and simultaneously subjecting such mixture to a nitrogen-containing gas and to the passage of an electric current therethrough, thereby sufficiently heating the briquets by the heat developed by the resister-elements to chemically change the briquets producing aluminum nitrid, substantially as described.

9. The method of producing aluminum nitrid by electrically-generated heat comprising forming a mechanical mixture composed of briquets to be chemically modified containing finely-divided aluminous and carbonaceous materials in the approximate proportion of 3 to 1 by weight, and substantially-infusible resister-elements of substantial size which do not enter into the chemical reaction and which are of greater electrical conductivity than and which prevent fusion of the briquets, and simultaneously subjecting such mixture to a nitrogen-containing gas and to the passage therethrough of an electric current, thereby sufficiently heating the briquets by the heat developed by the resister-elements to chemically change the briquets producing aluminum nitrid, substantially as described.

10. The method of producing aluminum nitrid by electrically-generated heat comprising forming a mechanical mixture composed of briquets to be chemically modified containing finely-divided aluminous and carbonaceous materials and practically-infusible resister-elements of substantial size which do not enter into the chemical reaction and which are of greater electrical conductivity than and which prevent fusion of the briquets, and subjecting such mixture to a nitrogen-containing gas and the passage of an electric current therethrough, thereby sufficiently heating the briquets by the heat developed by the resister-elements to chemically change the briquets thus producing aluminum nitrid, substantially as described.

11. The method of producing aluminum nitrid by electrically-generated heat comprising forming a mechanical mixture composed of briquets to be chemically modified containing finely-divided aluminous and carbonaceous materials in proportions sufficient only for the chemical reaction, and a sufficient number of practically-infusible resister-elements of substantial size which do not enter into the chemical reaction and which are of greater electrical conductivity than the briquets to prevent fusion of the latter, and simultaneously subjecting said mixture to a nitrogen-containing gas and the passage therethrough of an electric current thereby sufficiently heating the briquets by the heat developed by the resister-elements to chemically change the briquets thus producing aluminum nitrid, substantially as described.

12. The method of producing aluminum nitrid by electrically-generated heat comprising forming a mechanical mixture composed of briquets to be chemically modified containing finely-divided aluminous and carbonaceous materials in proportion for the chemical reaction and a sufficient number of larger practically-infusible resister-elements which do not enter into the chemical reaction and which are of greater electrical conductivity than the briquets to prevent fusion of the latter and simultaneously subjecting said mixture to a nitrogen-containing gas and the passage therethrough of an electric current thereby sufficiently heating the briquets by the heat developed by the resister-elements to chemically change the briquets thus producing aluminum nitrid, substantially as described.

13. The method of producing aluminum nitrid by electrically-generated heat comprising forming a mixture composed of briquets to be chemically modified containing finely-divided aluminous and carbonaceous materials and a sufficient number of substantially-infusible resister-elements of substantial size which do not enter into the chemical reaction and which are of greater electrical conductivity than the briquets to form in the mixture a sufficient number of parallel conductive paths composed solely of such resister-elements to prevent fusion of the briquets, and simultaneously subjecting the mixture to a nitrogen-containing gas and the passage of an electric current therethrough thereby sufficiently heating the briquets by the heat developed by the resister-elements to chemically change the briquets thus producing aluminum nitrid, substantially as described.

14. The method of producing aluminum nitrid by electrically-generated heat comprising forming a mixture composed of briquets to be chemically modified comprising finely-divided aluminous and carbonaceous materials and a sufficient number of larger substantially - infusible resister - elements which do not enter into the chemical reaction and which are of greater electrical conductivity than the briquets to form in the mixture a sufficient number of parallel conductive paths composed solely of such resister-elements to prevent fusion of the briquets, and simultaneously subjecting the mixture to a nitrogen-containing gas and the passage of an electric current therethrough thereby sufficiently heating the briquets by the heat developed by the resister-elements to chemically change the briquets thus producing aluminum nitrid, substantially as described.

15. The method of producing aluminum nitrid by electrically-generated heat comprising forming a mixture composed of briquets to be chemically modified containing finely-divided aluminous and carbonaceous materials and a sufficient number of carbon resister-elements of substantial size which do not enter into the reaction and which are of greater electrical conductivity than the briquets to prevent fusion of the latter, and simultaneously subjecting such mixture to a nitrogen-containing gas and the passage of an electric current therethrough, thereby sufficiently heating the briquets by the heat developed by the carbon resister-elements to chemically change the briquets thus producing aluminum nitrid, substantially as described.

16. The method of producing aluminum nitrid by electrically-generated heat comprising forming a mixture composed of briquets to be chemically modified containing finely-divided aluminous and carbonaceous materials in proper proportions for the chemical reaction and a sufficient number of carbon resister-elements of substantial size which do not enter into the reaction and which are of greater electrical conductivity than the briquets to prevent fusion of the latter, and simultaneously subjecting such mixture to a nitrogen-containing gas and the passage of an electric current therethrough, thereby sufficiently heating the briquets by the heat developed by the carbon resister-elements to chemically change the briquets thus producing aluminum nitrid, substantially as described.

17. The method of producing aluminum nitrid by electrically-generated heat comprising forming a mixture of briquets to be chemically modified containing finely-divided aluminous and carbonaceous materials in the proper proportions for the reaction and a sufficient number of larger carbon resister-elements which do not enter into the reaction and which are of greater electrical conductivity than the briquets to prevent fusion of the latter, and simultaneously subjecting such mixture to a nitrogen-containing gas and the passage of an electric current therethrough, thereby sufficiently heating the briquets by the heat developed by the carbon resister-elements to chemically change the briquets thus producing aluminum nitrid, substantially as described.

18. The process of producing aluminum nitrid consisting in subjecting a mechanical mixture of commingled briquets composed of alumina, carbon, and a binder, and heat-conductive chemically-neutral separators of substantial size to the action of heat and a nitrogen-containing gas, whereby the major portion of the alumina of the briquets is converted into aluminum nitrid, substantially as described.

19. The process of producing aluminum nitrid which consists in simultaneously subjecting to the action of electrically-produced heat and a nitrogen-containing gas a mechanical mixture of commingled briquets containing alumina and carbon, and larger chemically-neutral separators, substantially as described.

20. The process of producing aluminum nitrid which consists in passing an electric current through a mechanical mixture of commingled briquets containing alumina and carbon and chemically-neutral resister-elements of substantial size, and simultaneously subjecting the mixture to a flow of nitrogen-containing gas therethrough, substantially as described.

21. The process of producing aluminum nitrid consisting in passing an electric current through a mechanical mixture of commingled briquets containing finely-divided alumina and carbon, and chemically-neutral resister-elements of substantial size, and simultaneously subjecting the mixture to a flow of a nitrogen-containing gas, the quantity of resister-elements being only that required to prevent fusing of the briquets at a nitriding temperature, substantially as described.

22. The process of producing aluminum nitrid consisting in passing an electric current through a mechanical mixture of commingled briquets containing alumina and carbon and carbon-resister elements of substantial size, and simultaneously subjecting the mixture to a flow of a nitrogen-containing gas therethrough, the quantity of resister-elements being sufficient to provide through the mixture a plurality of parallel electric conductive paths composed entirely of such resister-elements, substantially as described.

23. The method of effecting a chemical reaction by electrically - generated heat comprising forming a mechanical mixture of commingled briquets to be chemically modified and practically - infusible resister - elements of substantial size which do not enter into the chemical reaction, and passing an electric current through the mixture thereby sufficiently heating the briquets by the heat developed by the resister-elements to effect the desired chemical change therein, substantially as described.

24. The method of effecting a chemical reaction by electrically - generated heat comprising forming a mechanical mixture of commingled briquets to be chemically modified and practically - infusible resister - elements of a substantial size different from that of the briquets and which do not enter into the chemical reaction, and passing an electric current through the mixture thereby sufficiently heating the briquets by the heat developed by the resister-elements to effect the desired chemical change therein, substantially as described.

25. The method of effecting a chemical reaction by electrically - generated heat comprising mixing briquets to be chemically modified and practically-infusible resister-elements of substantial size which do not enter into the chemical reaction, and simultaneously subjecting such mixture to the action of a gas and the passage of an electric current therethrough, thereby sufficiently heating the briquets by the heat developed by the resister-elements to effect the desired chemical change therein, substantially as described.

26. The method of effecting a chemical reaction by electrically - generated heat comprising forming a mechanical mixture composed of commingled briquets to be chemically modified and larger substantially-infusible resister-elements which do not enter into the chemical reaction, and passing an electric current through the mixture, thereby sufficiently heating the briquets by the heat developed by the resister-elements to effect the desired chemical change therein, substantially as described.

27. The method of effecting a chemical reaction by electrically - generated heat comprising forming a mechanical mixture of commingled briquets to be chemically modified and larger substantially - infusible resister-elements which do not enter into the chemical reaction, and simultaneously subjecting such mixture to the action of a gas and the passage therethrough of an electric current, thereby sufficiently heating the briquets by the heat developed by the resister-elements to effect the desired chemical change therein, substantially as described.

28. The method of effecting a chemical reaction by electrically - generated heat comprising forming a mechanical mixture of commingled briquets to be chemically modified and a sufficient number only of practically-infusible resister-elements of substantial size which do not enter into the chemical reaction to prevent fusion of the briquets, and passing an electric current through the mixture, thereby sufficiently heating the briquets by the heat developed by the resister-elements to effect the desired chemical change therein, substantially as described.

29. The method of effecting a chemical reaction by electrically - generated heat comprising forming a mechanical mixture of commingled briquets to be chemically modified and a sufficient number only of larger substantially - infusible resister - elements which do not enter into the chemical reaction to prevent fusion of the briquets, and simultaneously subjecting such mixture to the action of a gas and the passage therethrough of an electric current, thereby sufficiently heating the briquets by the heat developed by the resister-elements to effect the desired chemical change therein, substantially as described.

30. The method of effecting a chemical reaction by electrically - generated heat comprising forming a mechanical mixture of commingled briquets to be chemically modified and practically - infusible resister - elements of substantial size which do not enter into the chemical reaction, passing such mixture continuously between electrodes, and causing an electric current to flow through said electrodes and mixture, thereby sufficiently heating the briquets by the heat developed by the resisters to effect the desired chemical change therein, substantially as described.

31. The method of effecting a chemical reaction by electrically-generated heat comprising forming a mechanical mixture of commingled briquets containing chemical ingredients in the proportions for the reaction and practically-infusible chemically-neutral resister-elements of substantial size of the same material as one of the ingredients of the briquets, and passing an electric current through the mixture, thereby heating the briquets by the heat developed by the resister-elements sufficiently to effect the desired chemical reaction, substantially as described.

32. The method of effecting a chemical reaction by electrically-generated heat comprising forming a mechanical mixture of commingled briquets containing the chemical ingredients in the proportions for the reaction and practically-infusible chemically-neutral resister-elements of substantial size of the same material as one of the ingredients of the briquets, and simultaneously subjecting such mixture to the action of a gas and the passage of an electric current therethrough whereby the briquets are heated sufficiently by the heat developed by the resister-elements to effect the desired chemical change, substantially as described.

33. The method of effecting a chemical reaction by electrically-generated heat comprising forming a mechanical mixture of commingled briquets containing the chemical ingredients in the proportions for the reaction and larger substantially-infusible chemically-neutral resister-elements of the same material as one of the ingredients of the briquets, and simultaneously subjecting such mixture to a gas and the passage therethrough of an electric current, whereby the heat developed by the resister-elements heats the briquets sufficiently to effect the desired chemical reaction, substantially as described.

34. The method of producing aluminum nitrid by electrically-generated heat comprising subjecting to the passage of an electric current therethrough a mechanical mixture of finely-divided aluminous and carbonaceous materials in the proper proportions for the chemical reaction and a sufficient number of chemically-neutral carbon resister-elements of substantial size which do not enter into the chemical reaction and which are of greater electrical conductivity than the body of aluminous and carbonaceous materials to prevent fusion of such body or portions thereof, and simultaneously subjecting such mixture to a nitrogen-containing gas whereby the body of aluminous and carbonaceous materials is sufficiently heated by the heat developed by the resister-elements to produce aluminum nitrid, substantially as described.

35. The method of producing aluminum nitrid by electrically-generated heat comprising forming a mechanical mixture composed of approximately 35% to 40% by weight of briquets to be chemically modified containing finely-divided alumina and carbon in the approximate proportion of 3 to 1 by weight, the briquets being of cylindrical form about 2 inches in diameter and substantially 1¾ inches in length, and approximately 60% to 65% by weight of larger substantially-infusible chemically-neutral carbon resister-elements of irregular shape averaging about 5 to 6 inches in diameter which do not enter into the chemical reaction and which are of greater electrical conductivity than and which prevent fusion of the briquets, continuously feeding such mixture between relatively-stationary electrodes, heating an intermediate zone only of such traveling mixture by passing an electrical current therethrough, continuously circulating a nitrogen-containing gas through such mixture in quantity in excess of that required for the chemical reaction with the briquets and in a direction the opposite of that of the travel of such mixture, continuously removing a portion of the gas after traversing the mixture, continuously scrubbing the remaining gas, and continuously adding to the scrubbed gas a portion of fresh replenishing gas preliminary to its again traversing the mixture, whereby the briquets are sufficiently heated by the heat developed by the resister-elements to chemically change the briquets producing aluminum nitrid, and segregating the resister-elements from the chemically-transformed briquets and using them for a continuance of the process, substantially as described.

MARK SHOELD.